(12) United States Patent
Oishi et al.

(10) Patent No.: US 11,149,790 B2
(45) Date of Patent: Oct. 19, 2021

(54) LINEAR MOTION GUIDE UNIT AND METHOD OF MANUFACTURING THE SAME

(71) Applicant: NIPPON THOMPSON CO., LTD., Tokyo (JP)

(72) Inventors: Shinji Oishi, Mino (JP); Kenichiro Tsuruta, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 16/737,045

(22) Filed: Jan. 8, 2020

(65) Prior Publication Data

US 2020/0240467 A1 Jul. 30, 2020

(30) Foreign Application Priority Data

Jan. 30, 2019 (JP) .............................. JP2019-013886

(51) Int. Cl.
| | |
|---|---|
| *F16C 29/06* | (2006.01) |
| *F16C 29/04* | (2006.01) |
| *F16C 33/66* | (2006.01) |
| *B23P 15/00* | (2006.01) |

(Continued)

(52) U.S. Cl.
CPC ............ *F16C 29/06* (2013.01); *A47B 88/483* (2017.01); *A47B 88/487* (2017.01); *B21D 11/20* (2013.01);

(Continued)

(58) Field of Classification Search
CPC ...... F16C 29/005; F16C 19/048; F16C 29/06; F16C 29/0602; F16C 29/0609;
(Continued)

(56) References Cited

U.S. PATENT DOCUMENTS

| | | | | | |
|---|---|---|---|---|---|
| 4,089,568 | A | * | 5/1978 | Fall ....................... | A47B 88/487 384/18 |
| 5,553,946 | A | * | 9/1996 | Agari ...................... | F16C 29/04 384/49 |

(Continued)

FOREIGN PATENT DOCUMENTS

| | | | | |
|---|---|---|---|---|
| EP | 2441350 A1 | * | 4/2012 | ............. A47B 88/57 |
| EP | 3032178 A1 | * | 6/2016 | ........... A47B 88/487 |

(Continued)

*Primary Examiner* — Marcus Charles
(74) *Attorney, Agent, or Firm* — Browdy and Neimark, P.L.L.C.

(57) ABSTRACT

The present invention relates to a linear motion guide unit manufactured at low cost by forming at least a slider from a single metal plate, and reduced in sliding resistance of rolling elements as well as a method of manufacturing the same. The linear motion guide unit includes a guide rail, and the slider formed from a single metal plate. The guide rail has a bottom part, and a pair of longitudinal side parts standing from opposite sides of the bottom part, extending longitudinally in a mutually facing manner, and having respective raceway grooves in which the rolling elements roll. The slider includes an upper part, a pair of mutually facing sleeve parts extending downward from opposite sides of the upper part and having respective raceway grooves and return passages, and end cap parts formed respectively at opposite ends of the upper part and having turnaround grooves.

9 Claims, 9 Drawing Sheets

(51) Int. Cl.
  *A47B 88/48* (2017.01)
  *B21D 11/20* (2006.01)
  *B21D 5/00* (2006.01)
  *A47B 88/483* (2017.01)
  *F16C 29/00* (2006.01)
  *A47B 88/487* (2017.01)

(52) U.S. Cl.
  CPC .......... *B23P 15/003* (2013.01); *F16C 29/005* (2013.01); *F16C 29/048* (2013.01); *F16C 29/0602* (2013.01); *F16C 29/0609* (2013.01); *F16C 29/0635* (2013.01); *F16C 33/6603* (2013.01); *B21D 5/00* (2013.01); *F16C 2220/40* (2013.01); *F16C 2223/10* (2013.01)

(58) Field of Classification Search
  CPC .............. F16C 29/0635; F16C 29/0642; F16C 33/6603; F16C 33/6659; F16C 2220/40; F16C 2223/10; F16C 29/048; B23P 15/003; B21D 11/20; B21D 5/00; A47B 88/483; A47B 88/487
  USPC .... 384/18, 23, 43, 50; 29/898.055, 898.056, 29/898.13, 402.19; 312/334.1, 334.17
  See application file for complete search history.

(56) References Cited

U.S. PATENT DOCUMENTS

| | | | | |
|---|---|---|---|---|
| 6,105,920 | A * | 8/2000 | Gauger | B60N 2/067 248/429 |
| 7,178,888 | B2 * | 2/2007 | Judge | H05K 7/1489 312/334.44 |
| 8,201,901 | B2 * | 6/2012 | Craddock | B60N 2/773 312/334.11 |
| 8,485,616 | B2 * | 7/2013 | Chen | A47B 88/493 312/333 |
| 8,523,443 | B2 * | 9/2013 | Traiser | F16C 33/3856 384/49 |
| 8,534,782 | B2 * | 9/2013 | Yu | F16C 29/04 312/333 |
| 8,752,917 | B1 * | 6/2014 | Chang | A47B 88/487 312/333 |
| 2017/0175811 | A1 * | 6/2017 | Zimmermann | F16C 29/02 |

FOREIGN PATENT DOCUMENTS

| | | | |
|---|---|---|---|
| WO | 2007004488 A1 | 1/2007 | |
| WO | WO-2016157904 A1 * | 10/2016 | .......... F16C 29/0638 |

\* cited by examiner

LINEAR MOTION GUIDE UNIT AND METHOD OF MANUFACTURING THE SAME

FIELD OF THE INVENTION

The present invention relates to a linear motion guide unit that is applied to, for example, drawers of furniture and toys, and slides of wheelchair lifts of assistive vehicles and in which a slider can move along a longitudinal direction in relation to a guide rail, as well as a method of manufacturing the same.

BACKGROUND OF THE INVENTION

Conventionally, as a linear motion guide device, there is known a rolling guide device composed of a guide rail having a U-shaped cross section, and a slide member disposed slidably on the guide rail through a plurality of rolling elements. In the rolling guide device, the slide member is formed in a channel shape by bending a metal plate member to have a lateral web and a pair of flange parts located respectively at opposite sides of the lateral web in its width direction. Each flange part has a track groove in which balls circulate. The track groove is composed of a load-carrying straight groove in which the balls roll while carrying a load, a pair of ball-deflecting grooves for turning around the balls rolling from the load-carrying straight groove while releasing the balls from load, and a no-load straight groove for transferring the balls from one ball-deflecting groove to the other ball-deflecting groove. Further, in the rolling guide device, in order to prevent the rolling elements from dropping off the no-load straight groove and the deflecting groove, the no-load straight groove and the deflecting groove are formed so as to face the guide rail such that the rolling elements under no load move in sliding contact with the guide rail (see, for example, WO2007/004488).

Incidentally, in the rolling guide device disclosed in WO2007/004488, the slider has the load-carrying straight groove, or a load-carrying race, in which the rolling elements under load roll, the no-load straight groove, or a no-load race, in which the rolling elements released from load roll, and the deflecting grooves for changing the rolling direction of the rolling elements from one straight groove to the other straight groove. These grooves are formed in a pair of the flange parts located respectively at opposite sides (in the width direction) of the lateral web for allowing infinite circulation of the rolling elements. According to the disclosed method of manufacturing the rolling guide device, in order to reduce the number of components and manufacture the slide member simply and inexpensively, the slide member is formed from a single metal plate. Specifically, the flange parts that face the raceway grooves of the guide rail are formed by bending the metal plate in a shape having a U-shaped cross section. A depression is formed in each flange part by cutting, press forming, coining, or the like so as to form an elliptical-track-shaped infinite circulation circuit composed of the load-carrying straight groove, the no-load straight groove, and the deflecting grooves. In order to prevent the rolling elements from dropping off the no-load straight groove and the deflecting grooves, the no-load straight groove and the deflecting groove are formed so as to face the guide rail such that the rolling elements under no load move in sliding contact with the guide rail. However, since the rolling guide device does not have a structure for scooping up the rolling elements that roll toward the deflecting groove from the load-carrying straight groove, rolling of the rolling elements is disturbed at the boundary between the load-carrying straight groove and the deflecting groove, potentially resulting in the slider encountering difficulty in smooth sliding.

SUMMARY OF THE INVENTION

The present invention has been conceived to solve the above problem, and an object of the present invention is to provide an improved linear motion guide unit whose slider is formed by performing forming work on a single metal plate and whose guide rail may also be formed by performing forming work on a single metal plate. Specifically, the slider having raceway grooves, depressions, etc. is formed by press working, deep drawing, and like forming work, without reduction in plate thickness of the slider, which would result when the raceway grooves, depressions, etc. are formed by cutting work. The slider has an upper part having threaded holes, a pair of sleeve parts each having a raceway groove and a return passage, and a pair of end cap parts each having turnaround grooves. Rolling elements roll through a circulation circuit composed of a load-carrying race defined by a raceway groove of the slider and a raceway groove of the guide rail, the return passage, and a pair of the turnaround grooves. The improved linear motion guide unit can hold the rolling elements without increasing sliding resistance acting on the rolling elements rolling through the circulation circuit. In the improved linear motion guide unit, the rolling elements smoothly roll toward the turnaround groove from the load-carrying race.

Means to Solve the Problems

The present invention provides a linear motion guide unit comprising a guide rail having a U-shaped cross section and a slider formed from a single metal plate and disposed slidably on the guide rail through a plurality of rolling elements. The guide rail comprises a bottom part, and a pair of longitudinal side parts standing from opposite sides of the bottom part, extending along a longitudinal direction in a mutually facing manner, and having respective first raceway grooves in which the rolling elements roll. The slider comprises an upper part, a pair of sleeve parts extending downward from opposite sides of the upper part and extending in the longitudinal direction in a mutually facing manner, and a pair of end cap parts extending downward from the upper part and located respectively at opposite ends of the upper part and the sleeve parts. Each of the sleeve parts has a second raceway groove extending along the corresponding first raceway groove, and a return passage extending in parallel with the second raceway groove. The first raceway groove and the second raceway groove cooperatively define a load-carrying race. Each of the end cap parts has an arcuate turnaround groove for establishing communication between the load-carrying race and the return passage. The rolling elements roll in a circulation circuit composed of the load-carrying race, the return passage, and a pair of the turnaround grooves.

Preferably, each of the sleeve parts has a semi-cylindrical portion which is formed at a base-part side of the sleeve part, is curved inward, and defines the second raceway groove, and a cylindrical portion which is formed at a tip-part side of the sleeve part and defines the return passage.

Preferably, an opening formed at a longitudinal edge of the cylindrical portion which defines the return passage is smaller than the diameter of balls which serve as the rolling element, and is located inward of the second raceway groove of the sleeve part.

Preferably, the end cap parts extend downward from respective ends of the upper part and have the turnaround grooves formed therein in such a manner as to cover opposite ends of the sleeve parts and establish communication between the return passages and the load-carrying races.

Preferably, the turnaround groove has a scooping part formed at its end toward the load-carrying race for scooping up the rolling elements rolling toward the turnaround groove from the load-carrying race, and the scooping part is formed in such a manner as to protrude in a round shape into the first raceway groove of the guide rail.

Preferably, the metal plate that forms at least the slider has a substantially uniform thickness.

Preferably, the upper part of the slider has a threaded hole for mounting a counterpart member thereon; the threaded hole is formed on an inner circumferential surface of a cylindrical boss part formed by extruding a portion of the upper part toward a back side; and the bottom part of the guide rail has a mounting hole for mounting the guide rail on a base.

The present invention further provides a method of manufacturing the linear motion guide unit, the method comprising: preparing the metal plate such that the metal plate has an upper formation part to be formed into the upper part, sleeve formation parts to be formed into the sleeve parts, end cap formation parts to be formed into the end cap parts, and notches formed between the sleeve formation parts and the end cap formation parts and used for bending the metal plate; and bending, through press forming, the sleeve formation parts and the end cap formation parts in relation to the upper formation part so as to form the sleeve parts and the end cap parts.

Preferably, the method further comprises surface-hardening at least one of the guide rail and the slider.

Effects of the Invention

As mentioned above, the linear motion guide unit according to the present invention comprises the slider simply formed by press working from a single metal plate, and the guide rail having a U-shaped cross section. The guide rail comprises the bottom part, and a pair of the longitudinal side parts standing from the opposite sides of the bottom part. The slider is disposed slidably on the guide rail through a plurality of the rolling elements. The longitudinal side parts of the guide rail have the respective first raceway grooves in which the rolling elements roll. Each of the sleeve parts of the slider has the second raceway groove facing the first raceway groove, and the return passage in parallel with the second raceway groove. Each of the end cap parts of the slider has the turnaround groove for establishing communication between the return passage and the load-carrying race cooperatively defined by the first raceway groove and the second raceway groove. The rolling elements that carry load roll in the load-carrying race, and no-load rolling elements roll in the return passage and the turnaround groove. The rolling elements circulate infinitely in the circulation circuit composed of the load-carrying race, the return passage, and a pair of the turnaround grooves. The linear motion guide unit of the present invention uses the slider formed by bending a steel plate. Thus, the slider is low in rigidity as compared with a conventional slider formed by cutting from a metal block, but can be formed inexpensively and can be used in, for example, a slider of a drawer.

According to the present method of manufacturing the linear motion guide unit, since the load-carrying races, the return passages, and the turnaround grooves are formed merely by bending a single metal plate, the slider can be formed with a substantially uniform thickness without involvement of depression. Since the return passage and the turnaround groove are formed into a cylindrical shape and an arcuate shape, respectively, for allowing the no-load rolling elements to roll therein, the return passage and the turnaround groove can hold the rolling elements. That is, since the rolling elements rolling in a no-load passage can be held by the slider only without need to be pressed against another member for being held, there can be restrained sliding resistance for holding the rolling elements. Further, since the scooping part protrudes into the load-carrying race for scooping up the rolling elements rolling toward the turnaround groove from the load-carrying race, the scooping part can be located at a deep position of the load-carrying race, so that the scooping part can smoothly scoop up and allow rolling of the rolling elements rolling toward the turnaround groove from the load-carrying race. Also, in formation of the slider, the sleeve formation parts having the second raceway grooves and the circulation grooves and the end cap formation parts having the turnaround grooves are bent by a press toward the bottom part of the guide rail. Since notches are provided at the base parts of at least either the sleeve parts or the end cap parts, bending the sleeve parts is unlikely to influence the end cap parts, and vice versa. Also, the bending work is facilitated. Notably, in the case of formation of the slider from a thin metal plate for reducing weight, when a counterpart member is fixed to the slider with screws, the thin-plate slider may fail to provide a sufficient depth for threaded holes. However, according to the present invention, a portion of the metal plate is cylindrically extruded by deep drawing or burring, and the inner circumferential surface of the extruded portion is threaded to form a threaded hole. Accordingly, the threaded hole can be formed in such a manner as to be deeper than the plate thickness of the slider. Therefore, the counterpart member can be firmly fastened to the slider.

DETAILED DESCRIPTION OF THE EMBODIMENT

Figure 1:
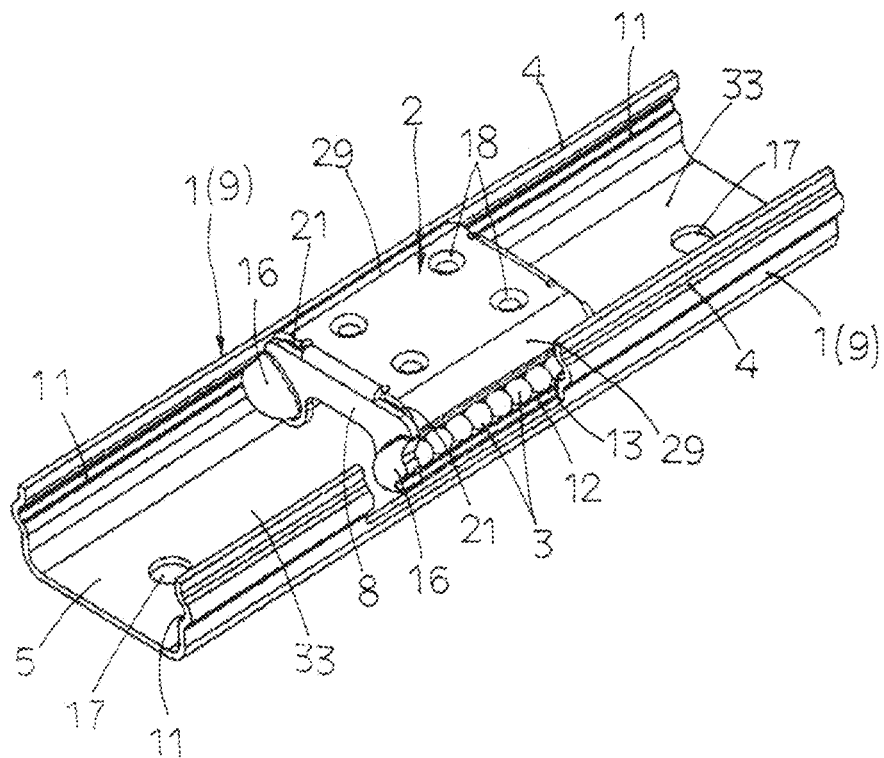
FIG. 1 is a perspective view showing an embodiment of a linear motion guide unit according to the present invention with a portion of a longitudinal side part of a guide rail being cut away.
Figure 2:
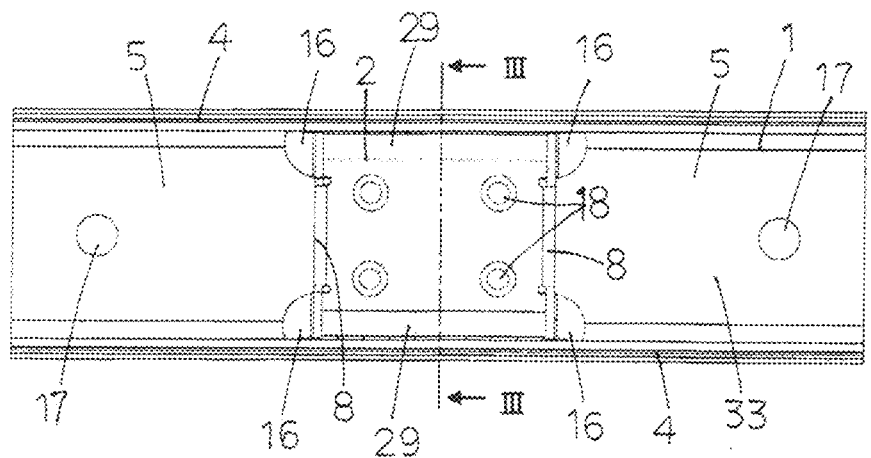
FIG. 2 is a plan view showing the linear motion guide unit of FIG. 1.

Next, with reference to the drawings, there will be described an embodiment of a linear motion guide unit according to the present invention as well as an embodiment of a method of manufacturing the linear motion guide unit. As shown in FIGS. 1 to 6, the linear motion guide unit is applied to, for example, drawers of furniture and toys, and slides of wheelchair lifts of assistive vehicles, and has a slider 2 that moves along a longitudinal direction in relation to a guide rail 1. The linear motion guide unit is characterized in that the guide rail 1 is formed from a metal plate 9 in such a manner as to have a gutter-shaped recess having a U-shaped cross section, and the slider 2 is formed from a single metal plate 10 and is disposed in the recess 33 having a U-shaped cross section of the guide rail 1 in such a manner as to be slidable in relation to the guide rail 1 through a plurality of rolling elements, or balls 3.

The guide rail 1 has a bottom part 5, or a base part, and a pair of longitudinal side parts 4 standing from opposite sides of the bottom part 5 and extending in the longitudinal direction in a mutually facing manner. Each of the longitudinal side parts 4 has a raceway groove 11 (first raceway groove) in which the balls 3 roll. The guide rail 1 is formed to have the recess 33 having a gutter-shaped cross section, for example, by performing plastic working on the flat metal plate 9 of chromium molybdenum steel with a press to impart a shape resembling letter U. The guide rail 1 has a plurality of mounting holes 17 formed in the bottom part 5 for allowing bolts or the like to be inserted when the guide rail 1 is to be mounted on, for example, a frame or a base of a structure (not shown). The guide rail 1 has raceway grooves 11 formed one piece each at opposite sides; i.e., at the paired longitudinal side parts 4, for allowing the balls 3 to roll in the raceway grooves 11. The raceway groove 11 of the guide rail 1 is formed by curving the longitudinal side part 4 in an outwardly swelling manner such that the bottom of the raceway groove 11 has a rounded cross section.

The slider 2 is formed, for example, by performing plastic working on the metal plate 10 of chromium molybdenum steel with a press. The slider 2 is characterized by being formed from a single metal plate 10. The slider 2 is disposed inside the guide rail 1 having a U-shaped cross section and can slidingly move along the guide rail 1 through the balls 3. The slider 2 has primarily an upper part 6, a pair of sleeve parts 7 extending downward from opposite sides of the upper part 6 and extending in the longitudinal direction in a mutually facing manner, and a pair of end cap parts 8 extending downward from the upper part 6 and located respectively at opposite end parts 23 of the upper part 6 and the sleeve parts 7. Each of the sleeve parts 7 of the slider 2 has a raceway groove 12 (second raceway groove) extending along the raceway groove 11 of the guide rail 1, and a return passage 14 extending in parallel with the raceway groove 12. The balls 3 roll in the raceway groove 12 and the return passage 14. Each of the end cap parts has arcuate turnaround grooves 15 in the form of end protrusions 16 for establishing communication between the return passage 14 and a load-carrying race 13 composed of the raceway groove 11 and the raceway groove 12. In the present embodiment, an end part 23 of each sleeve part 7 forms an inner wall surface of the turnaround groove 15. The balls 3 (serving as rolling elements) roll in a circulation circuit 24 composed of the load-carrying race 13, the return passage 14, and a pair of the turnaround grooves 15 located at the opposite ends of the slider 2 in response to a reciprocating movement of the slider 2 in relation to the guide rail 1. For smooth rolling of the balls 3 in the turnaround groove 15, the tip of the end part 23 is rounded.

Figure 13:
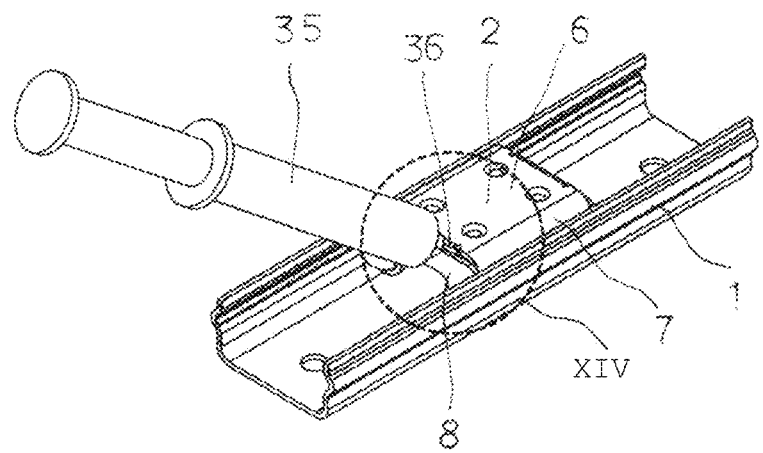
FIG. 13 is a perspective view showing an example of greasing the return passage of the slider of the linear motion guide unit with a mini grease injector.
Figure 14:
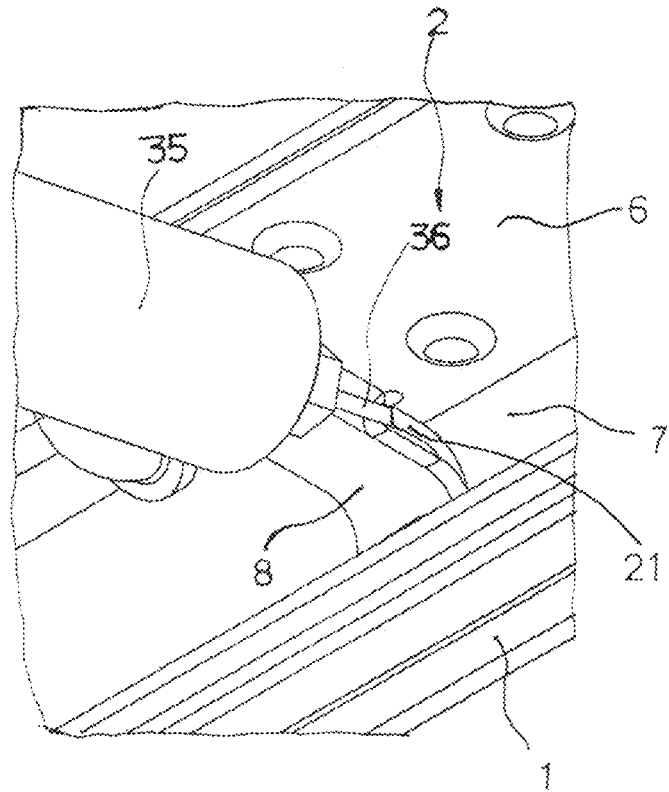
FIG. 14 is an enlarged perspective view of region XIV of FIG. 13.
Figure 15:
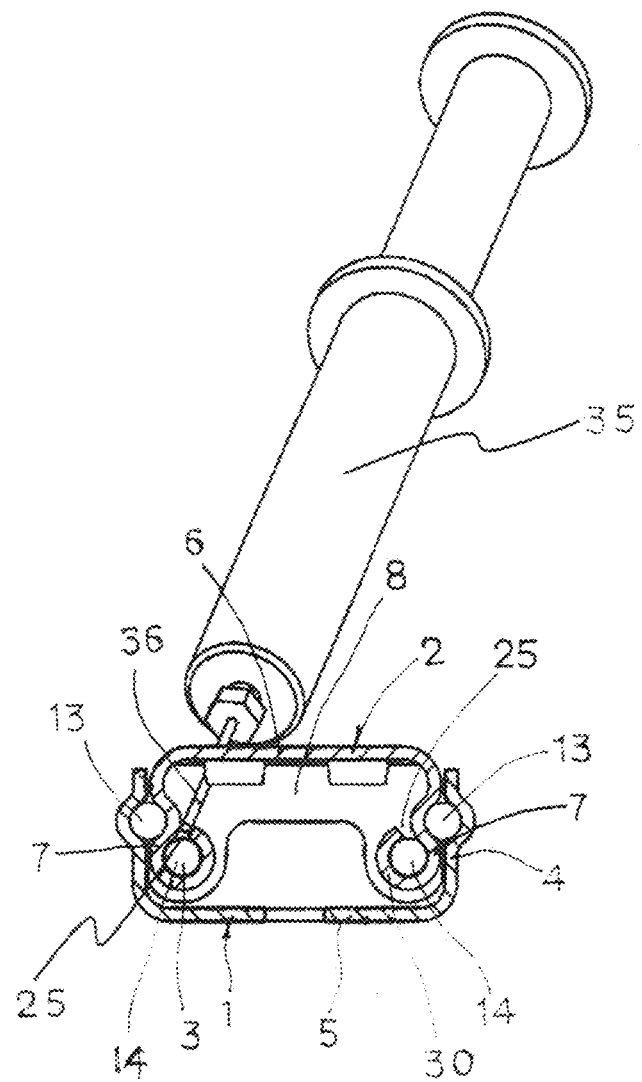
FIG. 15 is an explanatory view showing a state of greasing the slider of FIG. 13 as viewed from a different angle as well as a state in which the nozzle of the mini grease injector is inserted into a clearance formed in the slider.

In the linear motion guide unit, the upper part 6 of the slider 2 has threaded holes 18, for example, one piece each at corners, for mounting a counterpart member such as a drawer thereon. Each of the threaded holes 18 is formed in a cylindrical boss part 19 formed by extruding a portion of the upper part 6 toward a back side thereof. Each threaded hole 18 has a thread groove (not shown) formed in the inner circumferential surface of the boss part 19 cylindrically protruding toward the back side of a mounting portion. Each sleeve part 7 has a semi-cylindrical portion which is formed at a base-part side thereof, is curved inward, and defines the raceway groove 12, and a cylindrical portion which is formed at a tip-part side thereof and defines the return passage 14. A clearance 25 in the form of a slit is formed in a joint region of the cylindrical portion defining the return passage 14. The clearance 25 is smaller than the diameter of the ball 3 to prevent the ball 3 from dropping off therethrough. As shown in FIGS. 13 to 15, a nozzle 36 of a mini grease injector 35 is inserted into a notch 21, which will be described later, and then into the clearance 25 for feeding grease from the nozzle 36 to the return passage 14. The return passage 14 is located inward of the raceway groove 12 of the sleeve part 7. The end cap part 8 of the slider 2 has the turnaround grooves 15 formed therein in such a manner as to extend downward toward the bottom part 5 of the guide rail 1 and to cover the end parts 23 of the sleeve parts 7. Also, in the linear motion guide unit, the turnaround groove 15 has a scooping part 20 formed at its end located toward the load-carrying race 13 for scooping up the balls 3 rolling toward the turnaround groove 15 from the load-carrying race 13. The scooping part 20 is formed in such a manner as to protrude in a round shape into the raceway groove 11 of the guide rail 1.

Next, a method of manufacturing the linear motion guide unit according to the present invention will be described with reference to, particularly, FIGS. 7 to 10B. In the method of manufacturing the linear motion guide unit, a single metal plate 10 from which the slider 2 is manufactured is prepared, for example, by blanking, in such a manner as to have an upper formation part 26 for forming the upper part 6, sleeve formation parts 27 for forming the sleeve parts 7, and end cap formation parts 28 for forming the end cap parts 8. The metal plate 10 has notches 21 cut between the upper formation part 26 and the end cap formation parts 28. The metal plate 10 for forming the slider 2 is formed, for example, by blanking, in such a manner as to have the upper formation part 26, the sleeve formation parts 27, the end cap formation parts 28, and the notches 21 formed between the upper formation part 26 and the end cap formation parts 28.

Figure 7:
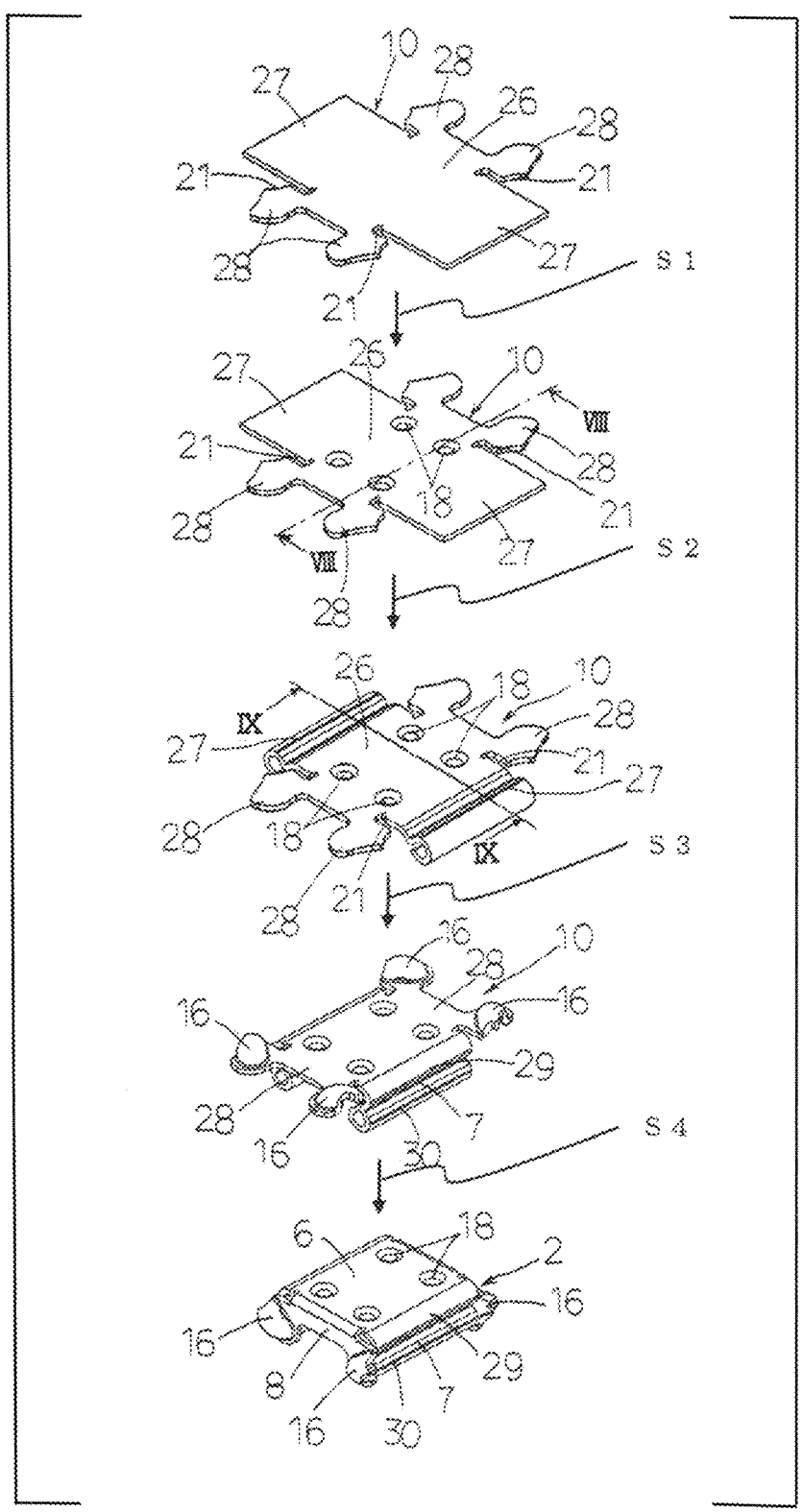
FIG. 7 is an explanatory view showing the steps of manufacturing the slider of the linear motion guide unit of FIG. 1.
Figure 8:
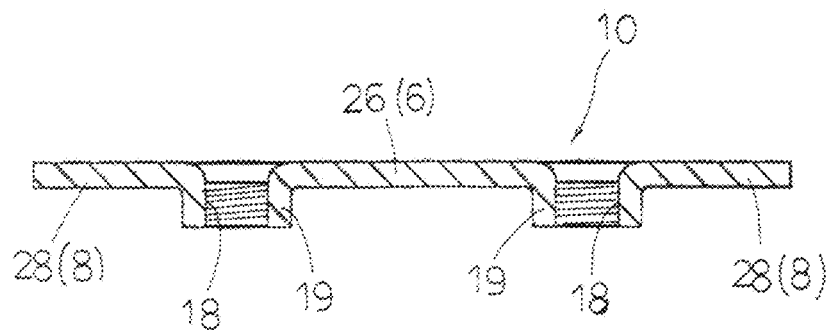
FIG. 8 is a sectional view of a metal plate taken along line VIII-VIII of FIG. 7 and used for explaining a step of forming threaded holes in the metal plate.
Figure 9:
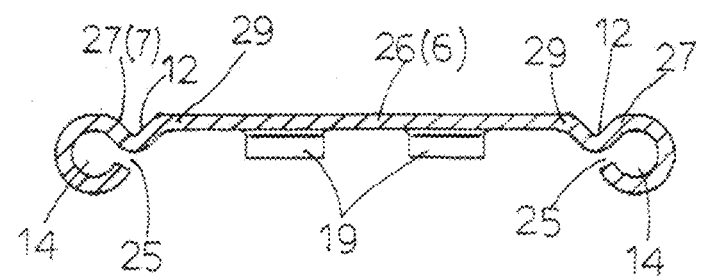
FIG. 9 is a sectional view of the metal plate taken along line IX-IX of FIG. 7 and used for explaining a step of forming return passages on the metal plate.
Figure 10A:
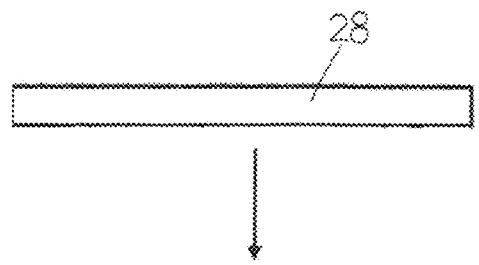
FIGS. 10A and 10B are an enlarged side view of the metal plate of FIG. 7 used for explaining a step of forming a turnaround groove on the metal plate.
Figure 10B:
Figure 11:
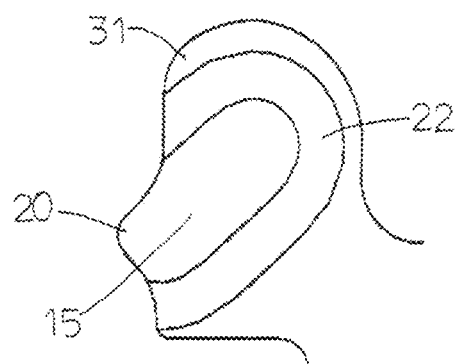
FIG. 11 is an enlarged bottom view of the turnaround groove of FIGS. 10A and 10B as viewed from a direction of introduction of a rolling element.

FIG. 7 shows a part of the method of manufacturing the linear motion guide unit; i.e., the steps (step S1 to step S4) of manufacturing the slider 2 (product) from the metal plate 10 obtained by blanking as described above. The metal plate 10 obtained by blanking and having the above-mentioned shape undergoes, for example, punching for forming preliminary holes therein and then undergoes burring at the positions of the preliminary holes for forming the boss parts 19 (see FIG. 8) protruding toward the back side (step S1). The threaded holes formed in the upper part 6 are formed by cutting threads in the inner circumferential surfaces of the boss parts 19 shown in FIG. 8. The sleeve parts 7 have a structure that allows easy formation by press forming. As shown in FIG. 9, each of the sleeve parts 7 is formed in such a manner as to have the raceway groove 12 and the return passage 14 by bending (step S2). The end cap formation parts 28 undergo drawing for forming the turnaround grooves 15 of the end cap parts 8 (step S3). As shown in FIGS. 10A, 10B, and 11, each end cap formation part 28 has an edge part 31, the turnaround groove 15 defined by a bending part 22, and the scooping part 20. Next, the end cap parts 8 are easily formed by bending the end cap formation parts 28 through press forming (step S4). Through the manufacturing steps from step S1 to S4, the slider 2 having a substantially uniform thickness is formed.

Figure 12:
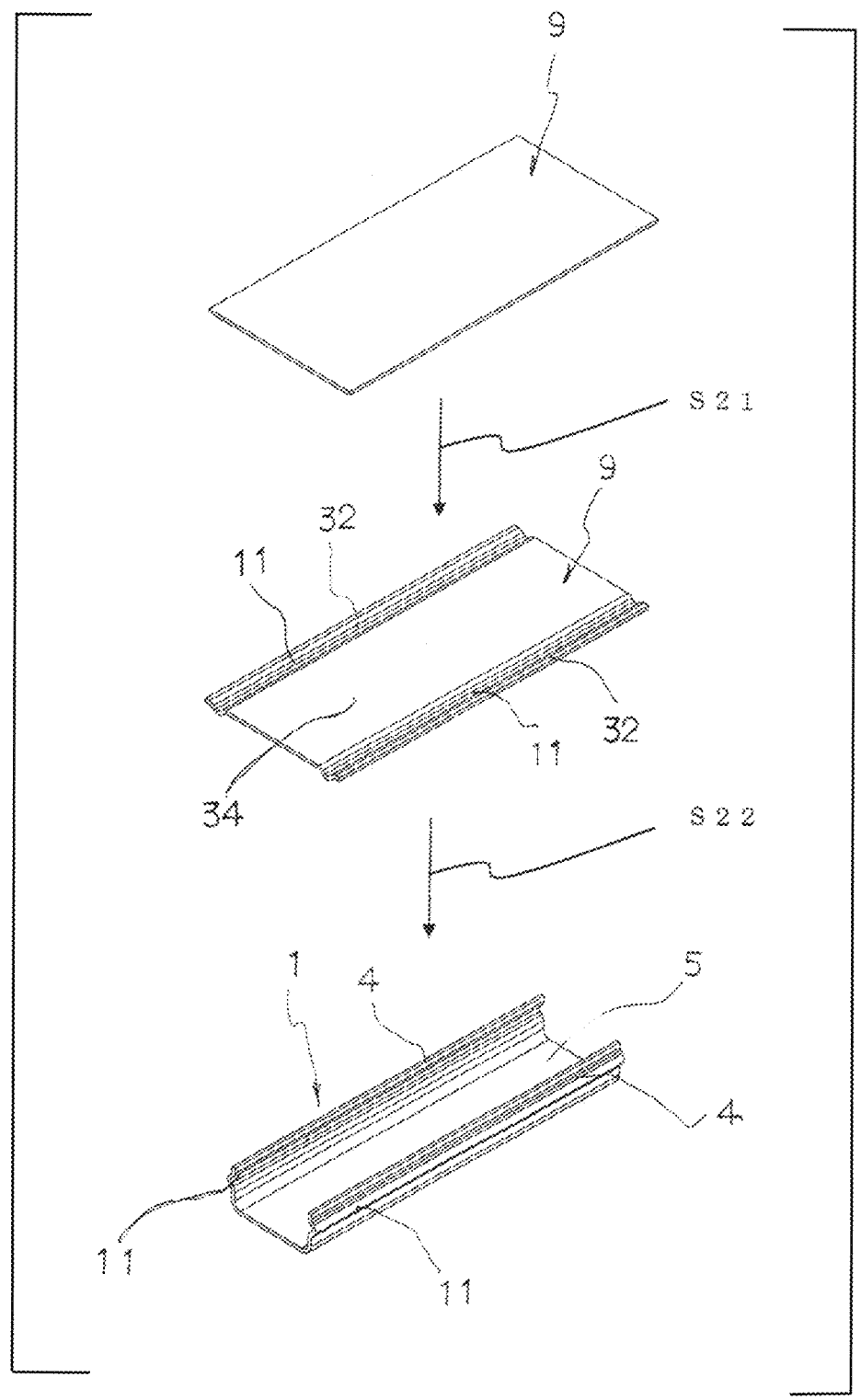
FIG. 12 is an explanatory view showing the steps of manufacturing the guide rail of the linear motion guide unit of FIG. 1.

The metal plate 10 used to form the slider 2 has a substantially uniform thickness. At least one of the guide rail 1 and the slider 2 is surface-hardened for extending service life through improvement of wear resistance of the raceway grooves 11 or 12. The guide rail 1 can be formed by performing forming work on a single metal plate 9. For example, as shown in FIG. 12, the metal plate 9 undergoes press-forming so as to have the bottom part 5 and a pair of the longitudinal side parts 4 standing from opposite sides of the bottom part 5 and extending in the longitudinal direction, thereby forming the recess 33 having a U-shaped cross section. The longitudinal side parts 4 have the respective raceway grooves 11 formed by press forming.

Figure 3:
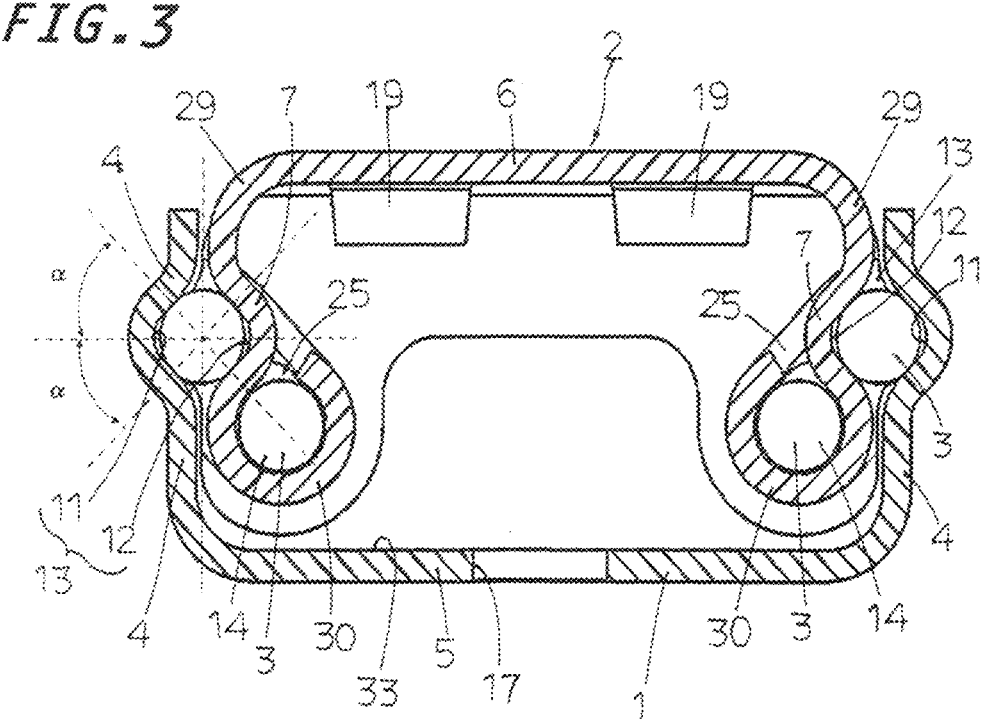
FIG. 3 is a sectional view of the linear motion guide unit taken along line III-III of FIG. 2.
Figure 4:
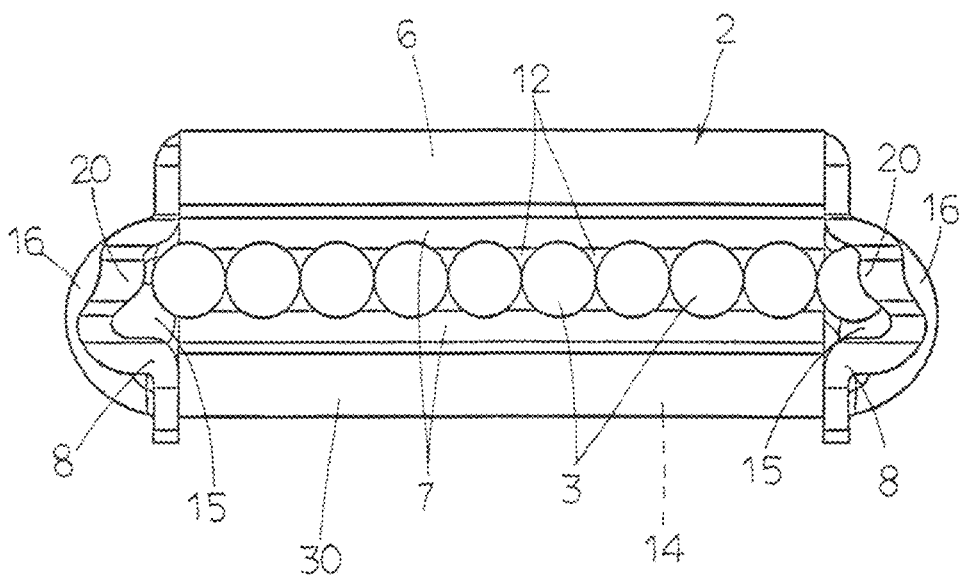
FIG. 4 is a side view showing a slider in a state in which the guide rail is removed from the linear motion guide unit of FIG. 1.
Figure 5:
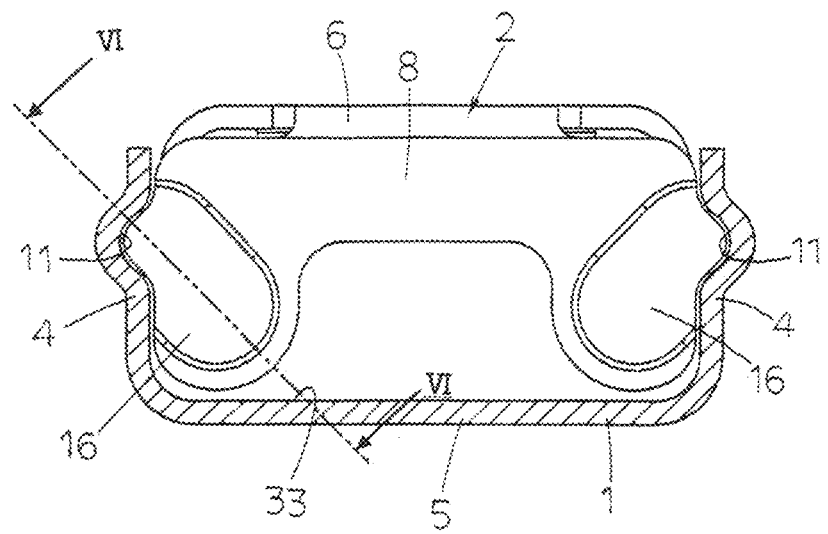
FIG. 5 is a side view showing the slider of the linear motion guide unit of FIG. 1 as viewed from an end with respect to a sliding direction.

In the method of manufacturing the linear motion guide unit, the single metal plate 10 is formed by blanking in such a manner as to have the upper formation part 26 for forming the upper part 6 of the slider 2, the sleeve formation parts 27 located at laterally opposite sides of the upper formation part 26 and used to form a pair of the sleeve parts 7 of the slider 2, and the end cap formation parts 28 located at longitudinally opposite sides of the upper formation part 26 and used to form the end cap parts 8 of the slider 2. The sleeve formation parts 27 located on the laterally opposite sides of the upper formation part 26 are formed, through pressing, into the respective sleeve parts 7 extending downward substantially at an angle of 90° with respect to the upper part 6. That is, the sleeve parts 7 and the upper part 6 form substantially an angle of 90°. A pair of the sleeve parts 7 and the upper part 6 impart a U-shaped cross section to the slider 2. Each of the sleeve parts 7 has a semi-cylindrical part which is formed through pressing, is located near a base part 29 thereof, and defines the raceway groove 12. Each of the raceway grooves 12 is formed such that the ball 3 is in contact with the raceway groove 12 at two points. The raceway groove 12 and the raceway groove 11 of the guide rail 1 define the load-carrying race 13 in which the balls 3 carrying load roll. As shown in FIG. 3, the load-carrying race 13 is formed into a so-called Gothic arch shape that comes into 4-point contact with the ball 3 substantially at a contact angle $\alpha$ of 45°. The load-carrying race 13 is not limited in shape to the Gothic arch shape, but can be formed into a circular arcuate shape with 2-point contact or a V-groove shape with 4-point contact.

Figure 6:
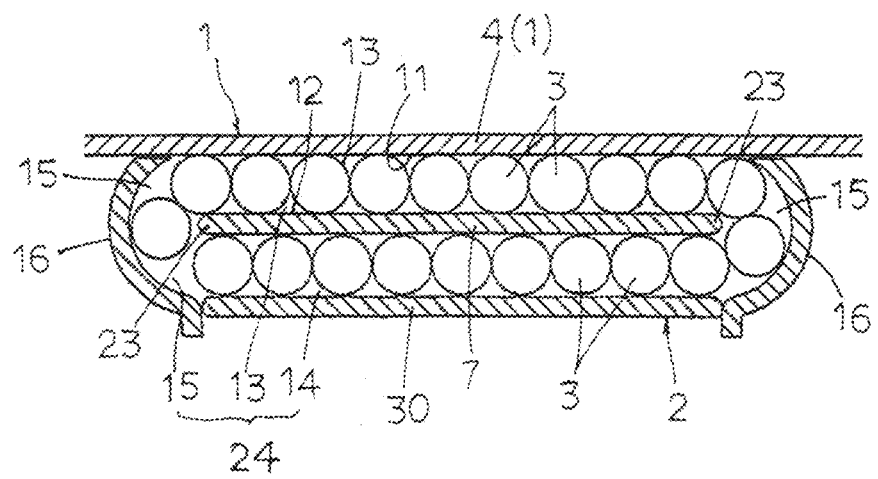
FIG. 6 is a sectional view of the slider taken along line VI-VI of FIG. 5.

Each sleeve formation part 27 has the return passage 14 which is formed at its tip part 30 and through which no-load balls (rolling elements) 3 roll. The return passage 14 is formed, for example, by curling work for curling the sleeve formation part 27 toward the inside of the slider 2 so as to have a cylindrical shape. The diameter of the return passage 14 is slightly greater than the diameter of the balls 3 to reduce a contact area between each ball 3 and the wall surface the return passage 14, thereby reducing sliding resistance. The end cap parts 8 are provided at ends of the upper part 6, located on opposite sides in a sliding direction of the slider 2 having a U-shaped cross section. Each of the end cap parts 8 has the turnaround grooves 15 for establishing communication between the load-carrying races 13 and the return passages 14. Each turnaround groove 15 has an arcuate passage for changing the moving direction of the ball 3, and the scooping part 20 for scooping up the balls 3 introduced into the turnaround groove 15 from the load-carrying race 13. The turnaround groove 15 is formed in such a manner as to connect or bridge the load-carrying race 13 and the return passage 14. The scooping part 20 of the turnaround groove 15 located toward the load-carrying race 13 protrudes in a round shape into the load-carrying race 13 toward the raceway groove 11 of the guide rail 1; in other words, the scooping part 20 is formed deep into the raceway groove 11. By means of the scooping part 20 scooping up the balls 3 rolling in the load-carrying race 13 toward the turnaround groove 15, the balls 3 roll smoothly to the turnaround groove 15. The slider 2 has the circulation circuits 24 each composed of the load-carrying race 13, the turnaround groove 15 on one side, the return passage 14, and the turnaround groove 15 on the other side for allowing infinite circulation of the rolling balls 3. As shown in FIG. 6, on the outer side of the turnaround groove 15, the end protrusion 16 protruding roundly outward is provided. Thus, the balls 3 are smoothly guided along the wall of the turnaround groove 15 without being caught at a connection between the load-carrying race 13 and the turnaround groove 15 or between the return passage 14 and the turnaround groove 15.

The steps of manufacturing the guide rail 1 in the linear motion guide unit will next be described with reference to FIG. 12. The metal plate 9, which is a single flat thin metal plate, is formed by blanking. Next, the metal plate 9 undergoes press-forming with a predetermined die to form the raceway grooves 11 at respective side formation parts 32, and, although unillustrated, the required mounting holes 17 are formed by punching (step S21). Next, the side formation parts 32 are bent substantially by 90° in relation to a bottom formation part 34 by press-forming with a predetermined die (step S22). Through these manufacturing steps, the metal plate 9 is formed into the guide rail 1 composed of the bottom part 5 and a pair of the longitudinal side parts 4.

Next, the steps of manufacturing the slider 2 in the linear motion guide unit will be described with reference to FIG. 7. Notably, a plurality of the sliders 2 can be continuously manufactured by progressive pressing work that continuously performs the steps of manufacturing the slider 2 in FIG. 7. According to the steps of manufacturing the slider 2, the metal plate 10, which is a single flat thin metal plate, is formed by blanking so as to have the upper formation part 26, the sleeve formation parts 27 located at laterally opposite sides of the upper formation part 26, and the end cap formation parts 28 located at longitudinally opposite sides of the upper formation part 26. The upper formation part 26 having a predetermined shape of the metal plate 10 undergoes burring for cylindrically extruding its portions to form the boss parts 19 as shown in FIG. 8. A thread groove (not shown) is formed in the inner circumferential surfaces of the boss parts 19 by tapping. Through such a series of working, the threaded holes 18 used to mount a counterpart member can be formed in the upper part 6 of the slider 2. Since the threaded holes 18 are formed in the respective boss parts 19 formed by extruding portions of the metal plate 10 as mentioned above, the threaded holes 18 can be deeper than the plate thickness of the metal plate 10. Next, the sleeve formation parts 27 of the metal plate 10 having the threaded holes 18 undergo press-forming for forming the raceway grooves 12 on the base part 29 side and the return passages 14 on the tip part 30 side. A portion of each sleeve formation part 27 located on the base part 29 side undergoes press-forming with a predetermined die to be depressively bent for forming the raceway groove 12 having an arcuate section (V-shaped cross section) as shown in FIG. 9. A portion of each sleeve formation part 27 located on the tip part 30 side undergoes press-forming with a predetermined die to be rounded into a cylindrical shape for defining the return passage 14 as shown in FIG. 9. In this working, the clearance 25 formed in a joint region of the cylindrical portion defining the return passage 14 can be formed into such a dimension as to prevent the balls 3 from dropping off therethrough. As a result, the balls 3 rolling in the return passage 14 are held in the return passage 14 without dropping off the return passage 14. Notably, the raceway grooves 12 and the return passages 14 can be formed by a method of simultaneously press-forming the raceway grooves 12 and the return passages 14 or a method of separately press-forming the raceway grooves 12 and the return passages 14.

Next, as shown in FIG. 9, the turnaround grooves 15 are press-formed on the metal plate 10 having the raceway grooves 12 and the return passages 14 formed at the sleeve formation parts 27. The turnaround grooves 15 are formed at the end cap formation parts 28 located at opposite ends of the upper part formation part 26 located on opposite sides in the sliding direction. Specifically, the metal plate 10 is formed such that a pair of the end cap formation parts 28 extend from the opposite ends of the upper formation part 26 in the sliding direction of the slider 2, and the end cap formation parts 28 are press-formed in an arcuate shape as shown in FIGS. 10 and 11. As a result, there are formed the turnaround grooves 15 for changing the moving direction of the balls 3. At the opposite ends of the upper formation part 26 in the sliding direction, the end cap formation parts 28 having the turnaround grooves 15 are bent downward from the upper formation part 26, whereby the turnaround grooves 15 are formed. The sleeve formation parts 27 each having the raceway groove 12 and the return passage 14 are bent downward by press-forming substantially at 90° with respect to the upper formation part 26, thereby forming the slider 2 having a U-shape section defined by the upper part 6 and the sleeve parts 7. At this time, by virtue of the notches 21 provided in the base parts of the end cap formation parts 28, force of bending the sleeve formation parts 27 is not transmitted to the end cap formation parts 28. Next, the end cap formation parts 28 at the opposite ends of the upper formation part 26 are bend vertically toward the bottom part 5 of the guide rail 1. As a result, the end cap parts 8 are disposed in such a manner as to close the opposite ends of the slider 2 located on the opposite sides in the sliding direction; in other words, as to close a space between the sleeve parts 7. Specifically, the end cap formation parts 28 are bent vertically substantially at 90° in relation to the upper formation part 26 by use of a predetermined die and a holder plate. At this time, by virtue of the notches 21 formed in the metal plate 10 at the base parts of the end cap formation parts 28, the end cap formation parts 28 can be easily bent.

The slider 2 formed with a press through the above manufacturing steps undergoes surface hardening such as carburizing, tempering, carbonitriding, soft nitriding, hard chrome plating, etc., thereby forming the slider 2 having a substantially uniform thickness of the present embodiment. As mentioned above, according to the present embodiment, since the slider 2 can be formed from only the single metal plate 10, the cost of manufacture of the slider 2 can be reduced; the number of parts of the linear motion guide unit can be reduced; the cost of manufacture of the linear motion guide unit can be reduced; the man-hour of assembling work can be reduced; and the man-hour of parts procurement and management can be reduced. Additionally, since the slider 2 is formed from the single metal plate 10 with a press in such a manner as to have a substantially uniform thickness, the slider 2 does not have a portion having a reduced thickness. Therefore, the slider 2 is free of deterioration in strength or a like problem, which would otherwise result from a reduction in plate thickness of the metal plate 10. Also, since the portion defining the return passage 14 in which the no-load balls 3 roll is formed into a cylindrical shape so as to prevent the balls 3 from dropping off the return passage 14, there is no need for the guide rail 1 to hold the balls 3 that roll in the return passage 14. Therefore, there can be prevented an increase in sliding resistance, which would otherwise result from sliding contact with the guide rail 1 of the balls 3 that roll in the return passage 14. Further, by virtue of provision of the scooping part 20 for scooping up the balls 3 rolling toward the turnaround groove 15 from the load-carrying race 13, the balls 3 rolling toward the turnaround groove 15 from the load-carrying race 13 can smoothly circulate. Also, by virtue of the notches 21 formed in the base parts of the turnaround grooves 15, force used to bend the sleeve parts 7 is unlikely to be transmitted to the turnaround grooves 15, and the end cap parts 8 can be easily bent. Notably, in the case where the slider 2 is formed from a thin metal plate 10 for reducing its weight and a counterpart member is fixed to the slider, the thin-plate slider 2 may fail to provide a sufficient depth for the threaded holes 18. However, according to the present invention, portions of the metal plate 10 are cylindrically extruded by burring, and thread grooves are formed in the inner circumferential surfaces of the extruded portions; i.e., the boss parts 19, thereby forming the threaded holes 18. Therefore, the depth of the threaded holes 18 can be greater than the plate thickness of the slider 2; thus, the counterpart member can be firmly fixed to the slider 2.

In the linear motion guide unit of the present embodiment, the metal plates 9 and 10 are of chromium molybdenum steel. However, the material is not limited thereto. For example, stainless steel may be used. In the case of impartation of higher hardness to the raceway groove 12, quenching and tempering can be performed after carbonitriding. For rust prevention, the guide rail 1 and the slider 2 can undergo known surface treatment without subjection to heat treatment. In need of rust prevention, austenitic stainless steel such as SUS304 and ferritic stainless steel such as SUS430 can be used. A notch like the notch 21 provided in the base part of each turnaround groove 15 can be provided between each sleeve formation part 27 and the upper formation part 26. Also, stoppers (not shown) can be provided at respective opposite ends of the guide rail 1 to prevent the slider 2 from coming off the guide rail 1. The linear motion guide unit of the present embodiment allows use of known lubricants such as lubricating oil, grease, etc. The load-carrying races 13, the return passages 14, and the turnaround grooves 15 can be firmly connected together by fixing the sleeve parts 7 and the end cap parts 8 together by welding or the like. The method of manufacturing the linear motion guide unit of the present embodiment is not limited to the above-mentioned method. For example, known press forming can be employed. Rolling elements are not limited to balls. For example, cylindrical rollers (not shown) can be employed. Each boss part 19 can also be formed, for example, by deep drawing. A method of manufacturing the guide rail 1 is not limited to press forming. Needless to say, the guide rail 1 can be manufactured by known working methods such as extrusion, drawing, roll forming, spinning, and rolling.

What is claimed is:

1. A linear motion guide unit comprising:
    a guide rail having a U-shaped cross section; and a slider formed from a single metal plate and disposed slidably on the guide rail through a plurality of rolling elements,
    wherein the guide rail comprises a bottom part, and a pair of longitudinal side parts standing from opposite sides of the bottom part, extending along a longitudinal direction in a mutually facing manner, and having respective first raceway grooves in which the rolling elements roll;
    the slider comprises an upper part, a pair of sleeve parts extending downward from opposite sides of the upper part and extending in the longitudinal direction in a mutually facing manner, and a pair of end cap parts extending downward from the upper part and located respectively at opposite ends of the upper part and the sleeve parts;
    each of the sleeve parts has a second raceway groove extending along the corresponding first raceway groove, and a return passage extending in parallel with the second raceway groove;
    the first raceway groove and the second raceway groove cooperatively define a load-carrying race;
    each of the end cap parts has an arcuate turnaround groove for establishing communication between the load-carrying race and the return passage; and
    the rolling elements roll in a circulation circuit composed of the load-carrying race, the return passage, and a pair of the turnaround grooves.

2. A linear motion guide unit according to claim 1, wherein each sleeve part has a semi-cylindrical portion which is formed at a base-part side of the sleeve part, is curved inward, and defines the second raceway groove, and a cylindrical portion which is formed at a tip-part side of the sleeve part and defines the return passage.

3. A linear motion guide unit according to claim 2, wherein an opening formed at a longitudinal edge of the cylindrical portion which defines the return passage is smaller than a diameter of balls which serve as the rolling element, and is located inward of the second raceway groove of the sleeve part.

4. A linear motion guide unit according to claim 1, wherein the end cap parts extend downward from respective ends of the upper part and cover opposite ends of the sleeve parts such that the turnaround grooves formed therein establish communication between the return passages and the load-carrying races.

5. A linear motion guide unit according to claim 1, wherein the turnaround groove has a scooping part formed at its end located toward the load-carrying race for scooping up the rolling elements rolling toward the turnaround groove from the load-carrying race, and the scooping part is formed such that the scooping part protrudes in a round shape into the first raceway groove of the guide rail.

6. A linear motion guide unit according to claim 1, wherein the metal plate that forms at least the slider has a substantially uniform thickness.

7. A linear motion guide unit according to claim 1, wherein the upper part of the slider has a threaded hole for mounting a counterpart member thereon; the threaded hole is formed in a cylindrical boss part formed by extruding a portion of the upper part toward a back side; and the bottom part of the guide rail has a mounting hole for mounting the guide rail on a base.

8. A method of manufacturing a linear motion guide unit according to claim 1, comprising:
    preparing the metal plate such that the metal plate has an upper formation part to be formed into the upper part, sleeve formation parts to be formed into the sleeve parts, end cap formation parts to be formed into the end cap parts, and notches formed between the sleeve formation parts and the end cap formation parts and used for bending the metal plate; and
    bending, through press forming, the sleeve formation parts and the end cap formation parts in relation to the upper formation part so as to form the sleeve parts and the end cap parts.

9. A method of manufacturing a linear motion guide unit according to claim 8, further comprising surface-hardening at least one of the guide rail and the slider.

* * * * *